United States Patent [19]
Pritt

[11] Patent Number: 6,150,973
[45] Date of Patent: Nov. 21, 2000

[54] AUTOMATIC CORRECTION OF PHASE UNWRAPPING ERRORS

[75] Inventor: Mark D. Pritt, Walkersville, Md.

[73] Assignee: Lockheed Martin Corporation, Bethesda, Md.

[21] Appl. No.: 09/361,182

[22] Filed: Jul. 27, 1999

[51] Int. Cl.[7] .................................................. G01S 13/90
[52] U.S. Cl. ...................... 342/25; 342/162; 342/179; 342/195
[58] Field of Search .............................. 342/25, 162, 165, 342/174, 179, 190, 191, 194, 195

[56] References Cited

U.S. PATENT DOCUMENTS

| | | | |
|---|---|---|---|
| 5,248,976 | 9/1993 | Niho et al. | 342/25 |
| 5,260,708 | 11/1993 | Auterman | 342/25 |
| 5,424,743 | 6/1995 | Ghiglia et al. | 342/25 |
| 5,442,359 | 8/1995 | Rubin | 342/109 |
| 5,463,397 | 10/1995 | Frankot | 342/25 |
| 5,552,787 | 9/1996 | Schuler et al. | 342/25 |
| 5,572,220 | 11/1996 | Cai | 342/442 |
| 5,608,405 | 3/1997 | Pritt | 342/25 |
| 5,659,318 | 8/1997 | Madsen et al. | 342/25 |
| 5,677,693 | 10/1997 | Frankot et al. | 342/25 |
| 5,701,074 | 12/1997 | Zhu | 324/307 |
| 5,774,089 | 6/1998 | Bamler et al. | 342/25 |
| 5,805,098 | 9/1998 | McCorkle | 342/25 |
| 5,835,055 | 11/1998 | van der Kooij | 342/25 |
| 6,011,505 | 1/2000 | Poehler et al. | 342/25 |
| 6,011,625 | 1/2000 | Glass | 356/357 |

OTHER PUBLICATIONS

R.M. Goldstein et al. "Satellite radar interferometry: two-dimensional phase unwrapping," *Radio Science*, vol. 23,, No. 4, pp. 713–720, 1988.

M.D. Pritt, "Congruence in least–squares phase unwrapping," *Proc. IGARSS*, Singapore, pp. 875–877, 1997.

*Primary Examiner*—John B. Sotomayor
*Attorney, Agent, or Firm*—Venable; Richard L. Aitken

[57] ABSTRACT

In a phase unwrapping and correction system, phase wrapped data is unwrapped with an unwrapping algorithm to obtain unwrapped image data. The unwrapped image data is further processed to correct the unwrapped image data by dividing the image represented by the unwrapped image data into regions defining boundaries corresponding to inconsistencies in the image data. The regions are then corrected by comparing them with one another and adjusting the multiples of $2\pi$ assigned to each region to minimize discontinuities between the regions.

20 Claims, 2 Drawing Sheets

AUTOMATIC CORRECTION OF PHASE UNWRAPPING ERRORS

This invention relates to phase unwrapping and more particularly to a method and apparatus which will operate to automatically process phase wrapped image data.

BACKGROUND OF THE INVENTION

In phase wrapped data, values are phases in the range of $-\pi$ to $\pi$ and correspond to unwrapped values which are an integer multiple of $2\pi$ plus the corresponding phase values of the phase wrapped data. Stated mathematically, the unknown unwrapped function ($\phi$) is wrapped into the interval $(-\pi, \pi)$ by the operation:

$$\Psi(t)=\phi(t)+2\pi k(t)$$

in which k(t) is an integer that forces $$-\pi<\Psi(t)\leq\pi$$

Phase unwrapping is converting the phase wrapped data into unwrapped data.

Phase unwrapping is an important step in topographical mapping of terrain because one of the preferred methods of mapping terrain elevation data is by means of interferometer synthetic aperture radar (IFSAR) measurements and the terrain elevation measurements obtained by IFSAR are phase wrapped values. Phase unwrapping is also used in other applications, such as wave front distortion and adaptive optics, the degree of magnetic field homogeneity in the water/fat separation of magnetic resonance imaging, and the relationship between the object phase and its bi-spectrum phase in astronomical imaging. The present invention is described in terms of its application to IFSAR, but the concept can be used in other applications as well.

Despite the importance of IFSAR for topographical mapping, the actual process of phase unwrapping is usually undertaken or supervised by a phase unwrapping scientist or engineer rather than a topographic user. The need for the phase unwrapping scientist or engineer to be involved in a phase unwrapping process results from the fact that there is no technique or system available which will automatically unwrap the phase wrapped data without intervention by an expert in phase unwrapping. There exist a large number of phase unwrapping algorithms, each with its own strength and weaknesses, but none of the algorithms can be used in a stand alone fashion by non-experts to process IFSAR data. In order to properly achieve the phase unwrapping, intervention by a phase unwrapping expert is required to adjust inconsistencies, to search for regions of incorrectly unwrapped phase or to chose a different algorithm for reprocessing. The only commercial product that performs phase unwrapping of IFSAR data is the Earth View™ IFSAR Software by PCI and Atlanta Scientific. The phase unwrapping step in this product requires human editing of what are called branch cuts and the human editing required is a tedious and time-consuming step. Additional examples of phase unwrapping is described in the text "Two-dimensional Phase Unwrapping: Theory, Algorithms, and Software", by D. C. Ghiglia and M. D. Pritt, published by John Wiley & Sons, New York, 1998. This text describes software for eight phase unwrapping algorithms, but a phase unwrapping expert is nevertheless required to evaluate the results and adjust algorithm parameters or to choose another algorithm should one algorithm fail on a given data set.

There is no phase unwrapping algorithm or system available in the prior art that is reliable and accurate enough to be used on a routine basis by non-experts. As a result, important applications like IFSAR processing still require a phase unwrapping expert to process the data. In particular, the lack of automatic phase unwrapping algorithm could adversely impact the NASA space shuttle mission to be launched in 1999 to map the topography of the entire earth.

SUMMARY OF THE INVENTION

The present invention solves the problems described above in that it provides a system which will automatically unwrap phase wrapped data and, in particular, IFSAR phase wrapped data, and will automatically correct the unwrapped data without the intervention of a phase unwrapping expert.

The phase wrapped IFSAR data is mapped over the coordinates of the terrain that it represents and when it is unwrapped, it will correspond to a terrain elevation model. Thus, the wrapped phase data and the unwrapped terrain elevation values are analogous to images and the phase wrapped data and the unwrapped elevation values are considered to be pixel values of the corresponding images. Accordingly, the phase wrapped IFSAR data is called phase wrapped image data and the unwrapped IFSAR values are called unwrapped image data. The unwrapped image data will be angular measurements typically expressed in radians. The unwrapped angular measurements in radians can be converted to linear measurements by multiplying the angular measurement by $\lambda/2\pi$ in which $\lambda$ is the length or dimension of $2\pi$ radians. In IFSAR phase data, $\lambda$ is proportional to the wavelength of the radar signals used to generate the unwrapped phase data and the unwrapped IFSAR phase data can be converted into elevation measurements in feet or meters by multiplying the unwrapped IFSAR data by $\lambda/2\pi$.

In accordance with the invention, a conventional phase unwrapping algorithm is applied to the phase wrapped data to obtain unwrapped image data, but which will be expected to include large areas of error. This unwrapped image data is then further processed by dividing the image represented by the data into segments or regions defined by boundaries corresponding to inconsistencies in the data. By dividing the images into regions in this manner, each region will have its phase unwrapped correctly except for the wrong multiple of $2\pi$ assigned to the whole region. In the unwrapped image data, the boundaries representing the inconsistencies in the data will be incomplete and the segmentation step carries out the process of completing the incomplete boundaries so that each region is isolated by being completely surrounded by a boundary. The regions are then corrected by comparing them with one another and adjusting the multiples of $2\pi$ assigned to each region to minimize discontinuities between the regions. Upon completion of this step of minimizing the discontinuities, the corrected unwrapped image will be provided.

In the above described process, the boundaries for the segmented regions correspond to discontinuities in the image. If the phase unwrapping algorithm initially applied to the phase wrapped data is the algorithm disclosed in the article entitled "Satellite Radar Interferometry: Two-Dimensional Phase Unwrapping", by Richard Goldstein, Howard A. Zebker and Charles L. Werner, published in Radio Science, Vol. 23, No. 4, pp. 713–720, 1988, then the discontinuities would correspond to the branch cuts identified by the Goldstein et al. algorithm. Alternatively, the discontinuities may correspond to unwrapped pixel values that differ from a neighboring pixel value by at least $\pi$ radians. With the phase unwrapping system as described above, the phase wrapped data can be unwrapped and corrected automatically without requiring intervention or judgment of a phase unwrapping expert and, thus, will readily provide correct topographical mapping from IFSAR measurements will be provided automatically.

DESCRIPTION OF A PREFERRED EMBODIMENT

Figure 1:
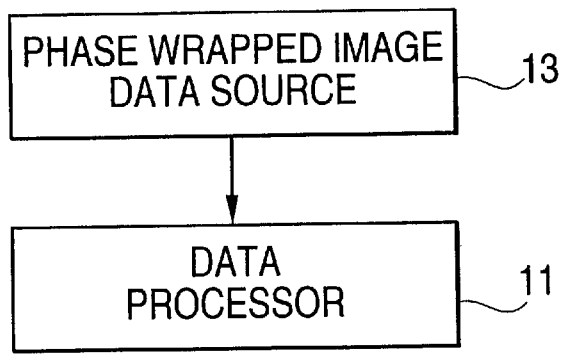
FIG. 1 is a block diagram of apparatus in which the system of the invention is employed.

As shown in FIG. 1, the present invention is embodied in the data processor 11 which is connected to receive phase wrapped image data from a phase wrapped image data source 13. The phase wrapped image data source may be a system for generating phase wrapped image data, such as a synthetic aperture radar system or it may be a source of stored image data.

The data processor 11 is provided with a computer program or software to carry out the process of the invention. In the process, as represented in the flow chart shown in FIG. 2, the wrapped phase data is processed by a phase unwrapping algorithm in step 21. The phase unwrapping algorithm may be any of several known algorithms including the phase unwrapping algorithm described in the *Radio Science* article by Goldstein, Zebker and Werner, the phase unwrapping algorithms disclosed in the aforementioned text by Ghiglia and Pritt, the phase unwrapping algorithms disclosed in U.S. Pat. No. 5,424,743, issued Jun. 13, 1995, invented by Dennis C. Ghiglia and Louis A. Romero or the phase unwrapping algorithms disclosed in U.S. Pat. No. 5,608,405, issued Mar. 9, 1997, invented by Mark Pritt. The disclosures in each of the above references of phase unwrapping algorithms is hereby incorporated by reference.

The unwrapped image data produced by the unwrapping algorithm must be congruent with the phase wrapped data, which means that if the unwrapped image data is rewrapped, the resulting wrapped image data will be identical with the original phase wrapped data. If the phase unwrapping algorithm is a path following algorithm like that disclosed in the Goldstein et al. *Radio Science* article, the unwrapped image data should be congruent with the phase wrapped image data. On the other hand, if the phase unwrapping algorithm carries out the unwrapping function by a least squares method, the unwrapped image data will not be congruent with the wrapped phase data. If the unwrapped image data is not congruent with the phase wrapped data, then after the processing of the phase wrapped data with the phase unwrapping algorithm, the resulting unwrapped image data is then processed in the congruence processing step 23, which is described in the aforementioned Ghiglia and Pritt text in Chapter 5 and the source code for which is found in Section 8.4 of Appendix A of the text, which are hereby incorporated by reference.

As explained in the Ghiglia and Pritt text, the congruence processing step computes the surface function $$\phi_{ij} + h + W(\Psi_{ij} - h) \quad (1)$$

in which $\phi_{ij}$ is the unwrapped surface, $W(.)$ is the wrapping operator which wraps the values of its argument into the range between $-\pi$ and $\pi$ by adding or subtracting an integral multiple of $2\pi$, $\Psi_{ij}$ represents the wrapped phase values corresponding to $\phi_{ij}$, $h=2\pi k/N$ in which k is an integer from 0 to N−1 and N is an operator selected integer. The surface function of Expression 2 is thus computed for different values of h distributed over the interval 0 to $2\pi$ and the value of h is determined which minimizes the number of discontinuities in the surface function. The congruence function then becomes:

$$\phi_{ij} = \phi_{ij} + H + W(\Psi_{ij} - \phi_{ij} - H) \quad (2)$$

in which H is the determined value of h that minimizes the number of discontinuities in the surface function (1). The computed values of $\phi_{ij}$ will be congruent with the unwrapped phase values $\Psi_{ij}$.

Following step 23, step 25 is carried out wherein the congruent unwrapped image data is segmented so that the image is divided into isolated regions separated by boundaries corresponding to the inconsistencies in the image represented by the unwrapped image data. If the congruence processing of step 23 is performed on the unwrapped image data represented by the output from the processing step 21, then the processing of step 25 will be performed on the congruent unwrapped image data produced by the process step 23. Otherwise, if the output data is already congruent, then the processing of step 25 may be performed on the image data produced by the processing of step 21. If the phase unwrapping algorithm of step 21 is the algorithm disclosed in the Goldstein et al. article in *Radio Science*, then the boundaries used to segment the image are the branch cuts produced by the Goldstein et al. algorithm. If the unwrapping algorithm does not produce branch cuts, then the boundaries in the image data will be represented by adjacent pixels in the image which differ from each other by greater than $\pi$. In the image data received by the process step 25, the boundaries will be largely incomplete and the data must be processed to separate the images into isolated regions with complete boundaries. This segmentation process is carried out in accordance with the disclosure described in copending application Ser. No. 09/354,723, filed Jul. 16, 1999, entitled "Image Segmentation System", invented by Mark Pritt (attorneys Docket No. A-21436), which is hereby incorporated by reference. In this process, pixels corresponding to discontinuities are identified to provide a discontinuity map of the image to be segmented. This discontinuity map is considered to constitute boundaries or parts of boundaries of regions to be formed by the segmentation process, which completes the partial boundaries into complete boundaries to divide the image into isolated regions. As an option to the segmentation process, a quality mask may be combined with the discontinuity map to define the boundary containing pixels to be used as the starting image for the segmentation process. A quality mask is derived from a quality map, which as disclosed in the Ghiglia and Pritt text is Section 3.3 and 3.4, comprises an array of values that define the quality or goodness of each pixel of the original phase wrapped data. The Ghiglia and Pritt text discloses several methods of generating quality maps. A quality mask is a quality map in which the pixel values are 0 or 1. The 0-valued pixels mark the lowest quality phase values in the phase wrapped data and the 1-valued pixels correspond to phase values which are considered likely to be accurate. To make a combined discontinuity and quality map, the pixels containing a discontinuity in the discontinuity map or which are 0-valued in the quality mask are identified as boundary containing pixels in the initial image operated on by the segmentation process. The disclosure in the Ghiglia and the Pritt text regarding quality maps and quality masks described in Sections 3.3 and 3.4 of the text is hereby incorporated by reference.

Following the segmentation of the image, in step 25, the regions are organized in a sequential order in step 27. In this step, a confidence factor or probability of correctness is assigned to each region. In the preferred embodiment, the confidence values are calculated based on the size of the regions wherein the greatest confidence factor or probability of correctness is assigned to the largest region and the lowest confidence factor or probability of correctness is assigned to the smallest region. The regions are initially placed in a sequential order in accordance with the assigned confidence factor with the region having the highest confidence factor being the first region in the sequence. This initial order is adjusted so that each region shares a boundary with at least one of its predecessors in the sequence. Finally, in the preferred embodiment, the order is then again further adjusted to maximize the number of border pixels at the boundary between successive regions in the order. Following ordering step 27, the unwrapped phase data in each region is corrected in step 29 by comparing the data of each region with adjacent regions which precede such region in the sequential order and then adjusting the multiples of $2\pi$ assigned to the unwrapped image data values assigned to each region to minimize the discontinuities between the regions. To make this determination, the regions are considered in the sequential order determined in step 27. Pixels in the region being considered bordering on a preceding region or regions in the sequential order are identified and compared with the adjacent pixels in preceding regions. If the two pixels differ by greater than $\pi$, then a discontinuity is judged to exist at that point. An additive multiple $2\pi k$ is determined for the region being considered, wherein k is an integer and wherein the additive multiple, when added to the pixels of the region under consideration, will minimize the number of discontinuities between the region being considered and the preceding adjacent regions. The pixels of the region being considered are adjusted by the additive multiple determined in this manner.

Figure 3:
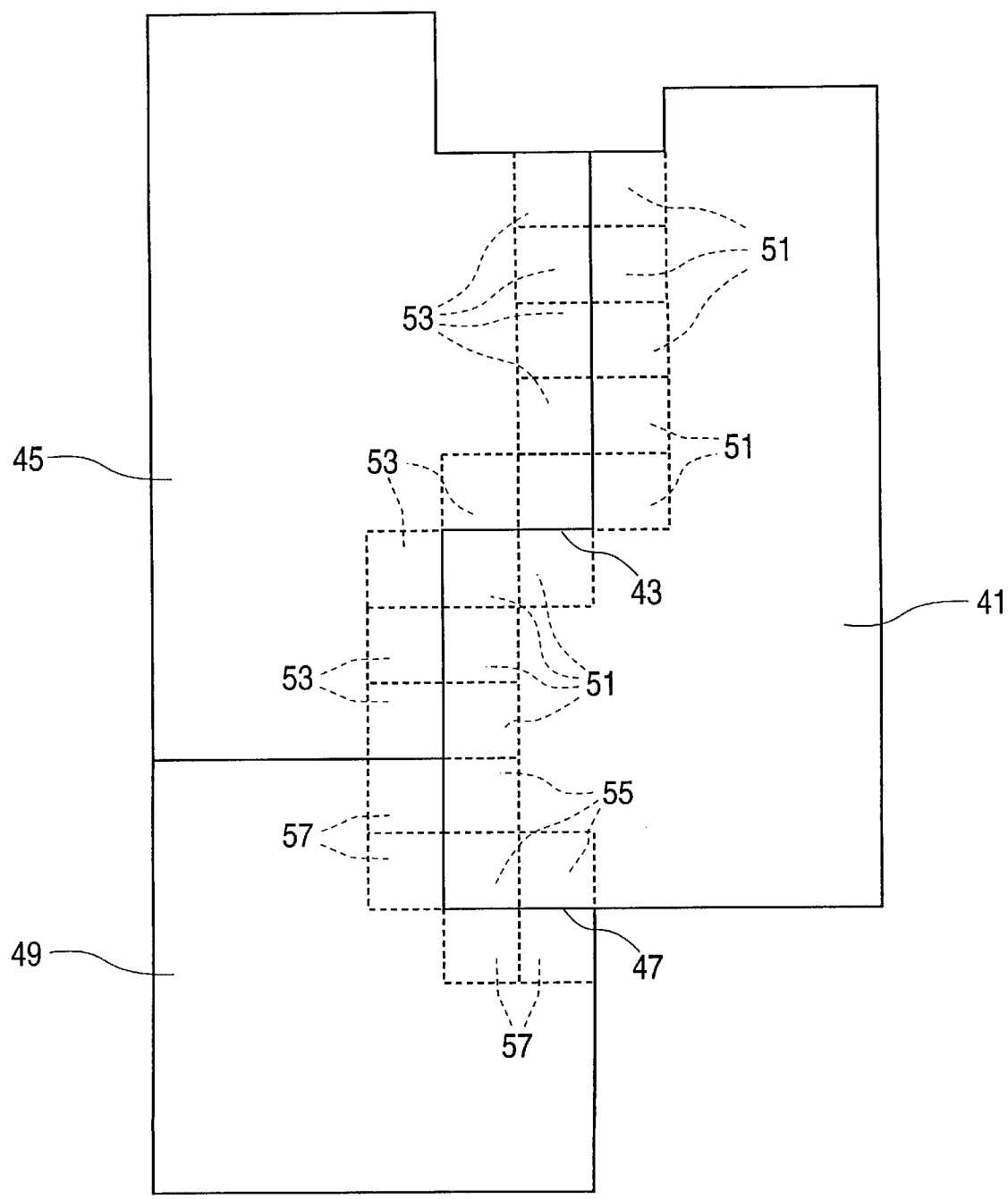
FIG. 3 is a diagram showing an example of how computations are made in the process of the invention.

To determine the value of the additive multiple $2\pi k$ for a region, each pair of adjacent border pixels between the region being considered and the preceding adjacent regions in the sequence are identified and the difference between the adjacent border pixels from the different adjacent regions is determined. The adjacent border pixels will differ from each other by an amount of $2\pi k+\phi$ wherein $2\pi k$ is an additive multiple and $\phi$ is a phase value between $-\pi$ and $\pi$. A majority of the differences between the adjacent border pixels should contain the same additive multiple $2\pi k$. The additive multiple which occurs most often in the differences is selected as the value of the additive multiple $2\pi k$ to be added to all the pixel values in the region being considered. For example, as shown in FIG. 3, region 41 shares a border 43 with region 45 and region 41 shares a border 47 with region 49. Regions 45 and 49 are presumed to precede region 41 in the sequential order determined in step 27. The region 41 has border pixels 51 adjacent to border pixels 53 in region 45 and has border pixels 55 adjacent to border pixels 57 in region 49. In the example, these are nine border pixels 51 and there are nine border pixels 53. The difference between each adjacent pair of pixels 51 and 53 is determined resulting in nine phase differences being determined. Similarly, the difference between each adjacent pair of pixels 55 and 57 is determined resulting in an additional four phase differences being determined making a total of 13 determined phase differences. Each phase difference is expressed as $2\pi k+\phi$ in which k is an integer. A majority of the 13 phase differences thus determined should have the same additive multiple $2\pi k$. The additive multiple which has the greatest number of occurrences in the 13 phase differences is selected as the additive multiple to be added to the pixels of region 41. This adjustment minimizes the inconsistencies between the region 41 and the preceding regions 45 and 49.

In the process of determining the value of the additive multiple $2\pi k$, a quality mask may be used to exclude consideration of the pixels of questionable validity, as indicated in the quality mask, in determining the additive multiple $2\pi k$. Specifically, the pixels eliminated by the quality mask are not considered in determining the additive multiple $2\pi k$ having the greatest number of occurrences in the differences between adjacent border pixels.

The process is repeated for each of the regions in sequence proceeding in the sequential order determined in step 27 until the additive multiple $2\pi k$ has been adjusted for each of the regions. Upon the completion of step 29, the resulting corrected unwrapped image data will be an accurate representation of the image. If the phase information was from an IFSAR application, then the resulting unwrapped data will be an accurate representation of the terrain elevation from which the IFSAR data was obtained. These results are achieved with only the phase unwrapped data as an input.

Figure 2:
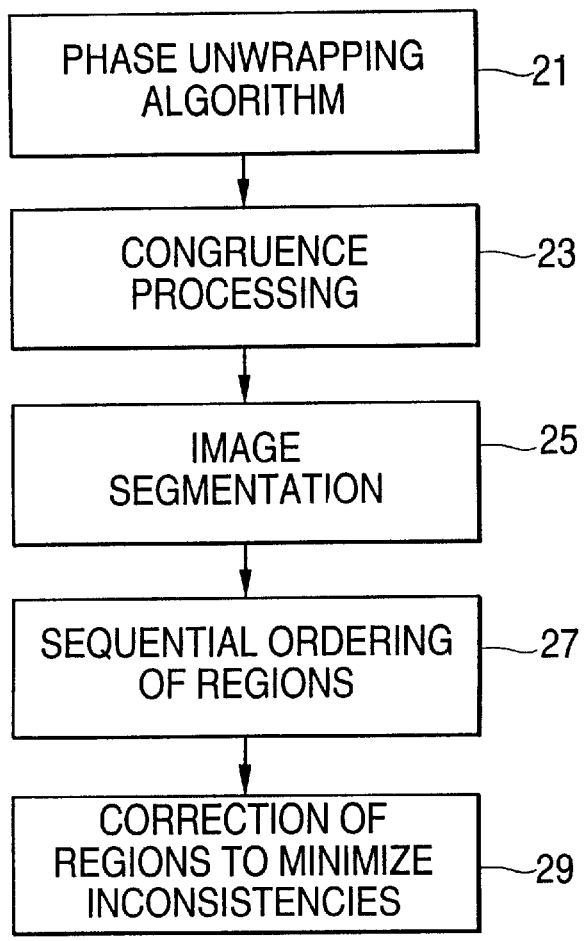
FIG. 2 is a flow chart of a process of the present invention.

The pseudo code listed below represents the process of the invention illustrated by the flow chart of FIG. 2.

1. Unwrap the phase data with any phase unwrapping algorithm.
2. Apply the "postprocessing congruence operation" to the result if needed.
3. Compute the discontinuities.
4. Segment the unwrapped phase into regions by using the discontinuities (and optionally a quality mask).
5. Assign a confidence factor (probability of correctness) to each region.
6. Modify the order of regions, if necessary, to ensure that each region B(i) touches (i.e., shares a boundary with) at least one of is predecessors B(0), B(1), . . . B(i−1).
7. Let $U=B_0$.
8. For i=1 to N−1
    Compute the discontinuities between $\partial U$ and $\partial B_i$, wherein $\partial U$ and $\partial B_i$ represent the border pixels in regions U and $B_i$, respectively, at the boundary between these two regions.
    Compute the additive multiple $2\pi k$ that minimizes these discontinuities and add the multiple to the phase values of $B_i$.
    Let $U=U \cup B_i$.
9. End-For.

In the pseudo code, the step of ordering the regions from the largest to the smallest must satisfy the requirement that each region touches or shares a boundary with at least one of its predecessors. This requirement is necessary because the discontinuities between each region B(i) and the union of its predecessor U must be computed in the pseudo code loop. For example, if B(0) touches B(1) and B(3), but B(2) touches B(3), but not B(0) or B(1), then the regions must be reordered in the order of B(0), B(1), B(3), B(2) and then relabeled. Preferably, the reordering is also be done to maximize the number of border pixels between successive regions. The number of border regions between successive regions is called the boundary measure. The reordering of the regions to maximize the boundary measure is carried out by the following pseudo code:

1. Let U=B(0).
2. For i=1 to N−1

3. Compute the boundary measure (number of border pixels) between U and B(j) for j=i to N−1.
4. Pick the index j, between i and N−2 inclusive, that yields the largest boundary measure.
5. If this boundary measure is nonzero then
6. Move region B(j) into position (i.e., index) i, then re-index the regions B(i), . . . , B(j−1) with the new indices i+1 to j. In other words, move B(j) into the current slot i, and slide the regions from B(i) to B(j−1) to the right to fill the empty slot j.
7. Else
8. Let U=B(i).
9. End-If
10. End-For The above pseudo code has the effect of reordering the regions so that each succeeding region will have the greatest border measure with the immediate preceding region. This reordering process can have the effect of a succeeding region not having any common border with any of the remaining regions in which case the reordering process (in instruction 8 of the above pseudo code listing) starts over with the next region in the sequence before the reordering to maximize the border measure between successive regions.

The above-described process is effective in automatically unwrapping and correcting phase wrapped image data into an accurate image representation. Alternatively, the process can comprise just the image correction portion of the process and operate to automatically correct unwrapped image data already previously unwrapped by a conventional phase unwrapping algorithm. In either case, an accurate image corresponding to the original phase wrapped data is obtained automatically by the software process in the data processor 11 without the intervention of a phase unwrapping expert.

The above description is of a preferred embodiment of the invention and modification may be made thereto without departing from the spirit and scope of the invention which is defined in the appended claims.

What is claimed is:

1. A method of automatically unwrapping and correcting phase wrapped data to generate an unwrapped two-dimensional pixel representation corresponding to said phase wrapped data comprising:
   1) unwrapping said phase wrapped data with a phase unwrapping algorithm to produce an uncorrected two-dimensional unwrapped pixel representation of said phase wrapped data;
   2) dividing said uncorrected two-dimensional unwrapped pixel representation into regions defined by boundaries corresponding to inconsistencies in said two-dimensional representation;
   3) adjusting the values of the pixels in said regions by adding selected additive multiples to the pixel values of each region wherein the pixels of a given region are adjusted by the same additive multiple and said additive multiples are selected to minimize the discontinuities between regions.

2. A method as recited in claim 1, wherein said regions are placed in a sequential order corresponding to a predetermined order criteria, said additive multiples being determined region by region in said sequential order with the additive multiple of each region being selected to minimize the discontinuities between such region and the preceding regions in said sequential order.

3. A method as recited in claim 2, wherein said ordering criteria is to maximize the border measure between successive regions in said order.

4. A method as recited in claim 2, wherein said regions are first placed in an initial order in accordance with region size and then said initial order is adjusted so that successive regions in the adjusted order have a common border with at least one preceding region in the order.

5. A method as recited in claim 4, wherein the order is adjusted to maximize the border measure between successive regions in the adjusted order.

6. A method as recited in claim 1, wherein said phase wrapped data corresponds to phase wrapped terrain elevation data obtained by a synthetic aperture radar and wherein said two-dimensional pixel representation represents a terrain elevation model corresponding to said phase wrapped terrain elevation.

7. A method as recited in claim 1, wherein said discontinuities correspond to adjacent pixels in different regions exceeding a predetermined value.

8. A method as recited in claim 7, wherein said phase wrapped data is wrapped in the interval between $-\pi$ and $\pi$ and said predetermined value is $\pi$.

9. A method as recited in claim 1, wherein said phase wrapped data is wrapped in the interval between $-\pi$ and $\pi$ and wherein said additive multiples are integer multiples of $2\pi$.

10. A method as recited in claim 1, wherein some of said inconsistencies correspond to incomplete boundaries, said dividing of said two-dimensional representation into regions including completing said incomplete boundaries to provide a boundary defining each of said regions.

11. A method of correcting a two-dimensional representation of unwrapped data derived from phase wrapped data comprising:
   dividing said two-dimensional pixel representation into regions defined by boundaries corresponding to inconsistencies in said two-dimensional representation;
   adjusting the values of the pixels in said regions by adding selected additive multiples to the pixel values of each region whereby the pixels of a given region are adjusted by the same additive multiple and said additive multiples are selected to minimize the discontinuities between regions.

12. A method as recited in claim 11, wherein said regions are placed in a sequential order corresponding to a predetermined order criteria, said additive multiples being determined region by region in said sequential order with the additive multiple of each region being selected to minimize the discontinuities between such region and the preceding region in said sequential order.

13. A method as recited in claim 12, wherein said ordering criteria is to maximize the border measure between successive regions in said order.

14. A method as recited in claim 12, wherein said regions are first placed in an initial order in accordance with region size and then said initial order is adjusted so that successive regions in the adjusted order have a common border with at least one preceding region in the adjusted order.

15. A method as recited in claim 14, wherein the order is adjusted to maximize the border measure between successive regions in the adjusted order.

16. A method as recited in claim 11, wherein said phase wrapped data corresponds to phase wrapped terrain elevation data obtained by a synthetic aperture radar and wherein said two-dimensional pixel representation represents terrain elevation model corresponding to said phase wrapped terrain elevation data.

17. A method as recited in claim 11, wherein said discontinuities correspond to adjacent pixels in different regions exceeding a predetermined value.

18. A method as recited in claim 17, wherein said phase wrapped data is wrapped in the interval between $-\pi$ and $\pi$ and said predetermined value is $\pi$.

19. A method as recited in claim 11, wherein said phase wrapped data is wrapped in the interval between $-\pi$ and $\pi$ and wherein said additive multiples are integer multiples of $2\pi$.

20. A method as recited in claim 11, wherein some of said inconsistencies correspond to incomplete boundaries, said dividing of said two-dimensional representation into regions including completing said incomplete boundaries to provide a boundary defining each of said regions.

* * * * *